United States Patent
Park et al.

(10) Patent No.: US 7,653,061 B2
(45) Date of Patent: Jan. 26, 2010

(54) METHOD OF GENERATING IPV6 FLOW LABEL

(75) Inventors: Mi Ryong Park, Daejeon (KR); Chang Min Park, Daejeon (KR); Sung Back Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 597 days.

(21) Appl. No.: 11/323,910

(22) Filed: Dec. 30, 2005

(65) Prior Publication Data

US 2007/0086486 A1    Apr. 19, 2007

(30) Foreign Application Priority Data

Oct. 19, 2005    (KR) ............... 10-2005-0098489

(51) Int. Cl.
*H04L 12/56* (2006.01)
*H04L 12/28* (2006.01)
*G06F 15/16* (2006.01)

(52) U.S. Cl. .................. 370/392; 370/389; 709/232
(58) Field of Classification Search .................. None
See application file for complete search history.

(56) References Cited

U.S. PATENT DOCUMENTS 6,658,002 B1 * 12/2003 Ross et al. ............ 370/392
2002/0133617 A1 * 9/2002 Davies ................. 709/238
2003/0097460 A1 * 5/2003 Higashiyama et al. ...... 709/232

FOREIGN PATENT DOCUMENTS

| EP | 0982909 | 3/2000 |
|---|---|---|
| KR | 20030021399 | 3/2003 |
| KR | 20030089747 | 11/2003 |
| KR | 10-2004-0054110 | 6/2004 |

OTHER PUBLICATIONS

Ditche. "IPv6 Protocol (RFC 2460 DS)." Sep. 2005. *IPv6DISSemination and Exploitation*.

* cited by examiner

*Primary Examiner*—Ricky Ngo
*Assistant Examiner*—Clemence Han
(74) *Attorney, Agent, or Firm*—Ladas & Parry LLP

(57) ABSTRACT

A method of generating a flow label of an Internet Protocol version 6 (IPv6) is provided. A terminal generates a flow label to have four tuple information selected from five tuple information according to the provided method when the terminal creates a header. A network device classifies flows based on the four tuple information in the flow label generated according to the provided method. Since the flow label is generated to include only selected information and the network device analyzes less amount of information to classify the flows, the processing overhead is reduced. Also, since the terminal generates the flow label with selected essential information to classify the flows, the network device can finely classify the flows. Therefore, the differentiated service can be provided.

3 Claims, 3 Drawing Sheets

METHOD OF GENERATING IPV6 FLOW LABEL

RELATED APPLICATION

The present application is based on, and claims priority from, Korean Application Number 2005-0098489, filed Oct. 19, 2005, the disclosure of which is hereby incorporated by reference herein in its entirety.

BACKGROUND OF THE INVENTION

1. Field of the Invention

The present invention relates to a method of generating a flow label of an Internet Protocol version 6 (IPv6), and more particularly, to a method of generating a flow label of IPv6 based on information about a service protocol and a source/destination port at an IPv6 terminal in order to guarantee a service quality (QoS) at IPv6.

2. Description of the Related Art

An address scheme of an Internet protocol version 4 (IPv4) defines a flow of data stream based on five tuple configured of a source IP address, a destination IP address, a service protocol such as a transmission control protocol/user datagram protocol (TCP/UDP), a source port, and a destination port in order to classify data stream transmitted from a source to a destination. Additionally, the IPv4 guarantees a flow based quality of service (QoS) by additionally defining and using a service type (ToS) field or a different service code point (DSCP) field.

According to the development of Internet, the IPv4 was advanced to IPv6. The IPv6 allows a network device to classify flows of data stream according to the address scheme of the IPv4 for guaranteeing the Internet QoS. In case of the IPv6, various headers are overlapped in a chain based manner at a packet of the IPv6. Accordingly, it requires complicated operation steps to process the IPv6 packets to find a service protocol between a source and a destination and a source/destination port. Such an annoying and time consuming process slows down to process the IPv6 packets. In order to overcome such a drawback of the IPv6, the IPv6 supports a 1byte of a traffic class field that was defined in the IPv4 to provide a differentiated service, and also defines a 20 bit of a flow label having three tuple information in order to effectively and simply identify a source IPv6 address, a destination IPv6 address and a flow. If a network device uses such a flow label defined in the IPv6 to classify the flows of the data stream, processing overhead of the network device is reduced because the network device is not required to search many header information to find five tuple information.

The flow label defined in the IPv6 allows a network device to classify flows of data stream without searching headers to find information such as a service protocol, i.e., TCP/UDP, a source port and a destination port, which is attached front of a user protocol data in a packet when the network device receives a packet with many IPv6 headers. However, the flow label is not recognized by a network device that receives a packet with the flow label directly from a terminal in an IPv6 network. It is because the flow label is created by the terminal. Also, the flow label cannot be modified or changed by the network device. Such a limitation makes difficult to guarantee the signal quality (QoS) without specific signaling between the terminal and the network device.

In order to use the flow label, a terminal must previously set a network service quality guarantee based on a resource reservation protocol (RSVP) to generate the flow label. Or, the terminal must record values of a network service quality guarantee in a packet when the terminal transmit a first packet to a network device so that a network device recognizes the first packet as a packet already processed internally. However, conventional related technologies have drawbacks to classify the flows of the data stream as follows. At first, an Internet address scheme of IPv4 is not rapidly changed into the address scheme of IPv6. Also, a backbone router has an overhead problem of processing numerous flows and a flow aggregation problem in order to provide a flow based Internet QoS even in an IPv4 based network. Furthermore, the backbone router has a processing overhead of a flow refresh message which is periodically retransmitted.

As described above, a terminal forms a flow configured of five tuple information to classify each session when the terminal creates a header of an IPv6 packet. But, a network device has the processing overhead problem due to the five tuple information. Therefore, the flow label is defined to allow the network device classify the flow using only three tuple information instead of using five tuple information. However, the flow label causes a significant processing overhead in a network device, specially in a network device in a backbone, when a service quality level per a flow is reserved using the flow label As a conventional technology related to the IP packet classification for guaranteeing QoS, an apparatus and a method for classifying an IP packet by extracting and combining a destination address (DA) and a source address (SA) from an IP packet header is disclosed in Korea Patent Publication No. 2004-54110 entitled "APPARATUS OF IP PACKET CLASSIFICATION BASED ON TUPLE SPACE SEARCH AND METHOD THEREOF" issued at 9th Dec. 2004. As another conventional technology, a method of improving a speed of packet classification by searching flows in high-speed in an internal cash memory storing a flow table was introduced in Korea Patent Publication No. 2003-89747 entitled "ROUTER PROVIDING DIFFERENTIATED QUALITY OF SERVICE AND FAST INTERNET PROTOCOL PACKET CLASSIFICATION METHOD FOR THE SAME."

In these conventional technologies, a time of searching is reduced by generating and processing a two-dimensional tuple in a cache for classifying input packets, or a speed of classifying a packet increases by additionally including an internal cache and storing a flow table in the cache. However, a method of generating a new flow label is not disclosed.

SUMMARY OF THE INVENTION

Accordingly, the present invention is directed to a generation method of IPv6 flow label that substantially obviates one or more problems due to limitations and disadvantages of the related art.

An object of the present invention is to provide a method of generating a flow label of an IPv6 for allowing a network device to easily analyze the flow label, provide a differentiated services and expand a classification level of the differentiated services by enabling an IPv6 terminal to record information about a service protocol, a source port and a destination port in the flow label and to transmit the flow label to the network device for differentiating a quality of service (QoS) from others.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of generating a flow label for an IPv6 (Internet Protocol version 6) including: forming a flow based on a five tuple configured of a source IPv6 address, a destination IPv6 address, a protocol, a source port and a destination port at an IPv6 terminal; and generating a flow label to have information about a service protocol, a source port and a destination port for inserting the generated flow label into a header of an IPv6 packet based on the formed flow.

The flow label may include a 3 bit of protocol field, a 1 bit of SD field and a 16 bit of source/destination port field.

The service protocol may be one selected from the group consisting of a UDP (user datagram protocol), a TCP (transmission control protocol), a SCTP (stream control protocol) and a DCCP (datagram congestion control protocol) or a predetermined control protocol.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
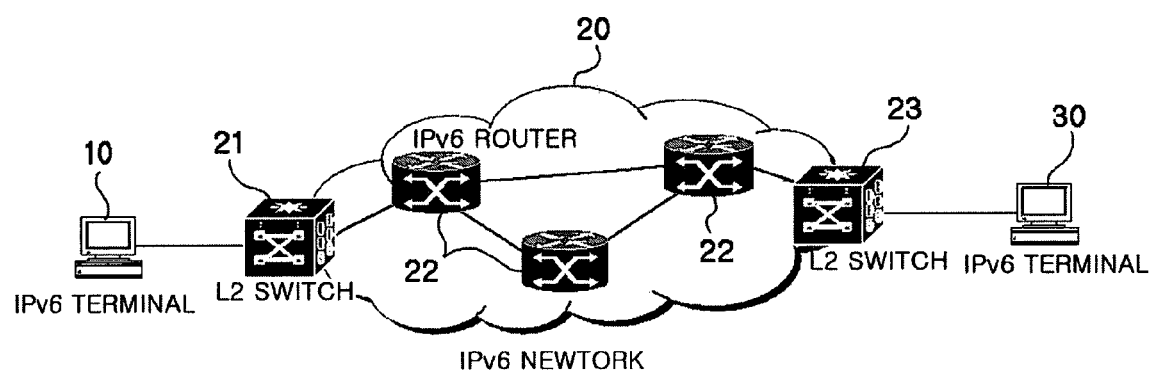
FIG. 1 is a view showing an IPv6 based network including terminals and network devices transmitting and receiving an IPv6 packet with an IPv6 flow label according to an embodiment of the present invention.

FIG. 1 is a view showing an IPv6 based network including terminals and network devices transmitting and receiving an IPv6 packet with an IPv6 flow label according to an embodiment of the present invention.

Referring to FIG. 1, the IPv6 based network 20 includes a plurality of IPv6 routers 22 and a plurality of L2 switches 23. And, a plurality of IPv6 terminals 10 and 30 are connected to the IPv6 based network 20 through the L2 switches 23. The IPv6 terminals 10 and 30 and the IPv6 routers 22 provides communication services based on the IPv6 address scheme. And, the L2 switches 21 and 23 and a L3 switch performs an aggregation operation for the IPv6 terminals 10 and 30. The IPv6 based network 20 has a communication scheme identical to an IPv4 but has an address scheme different from the IPv4.

Figure 2:
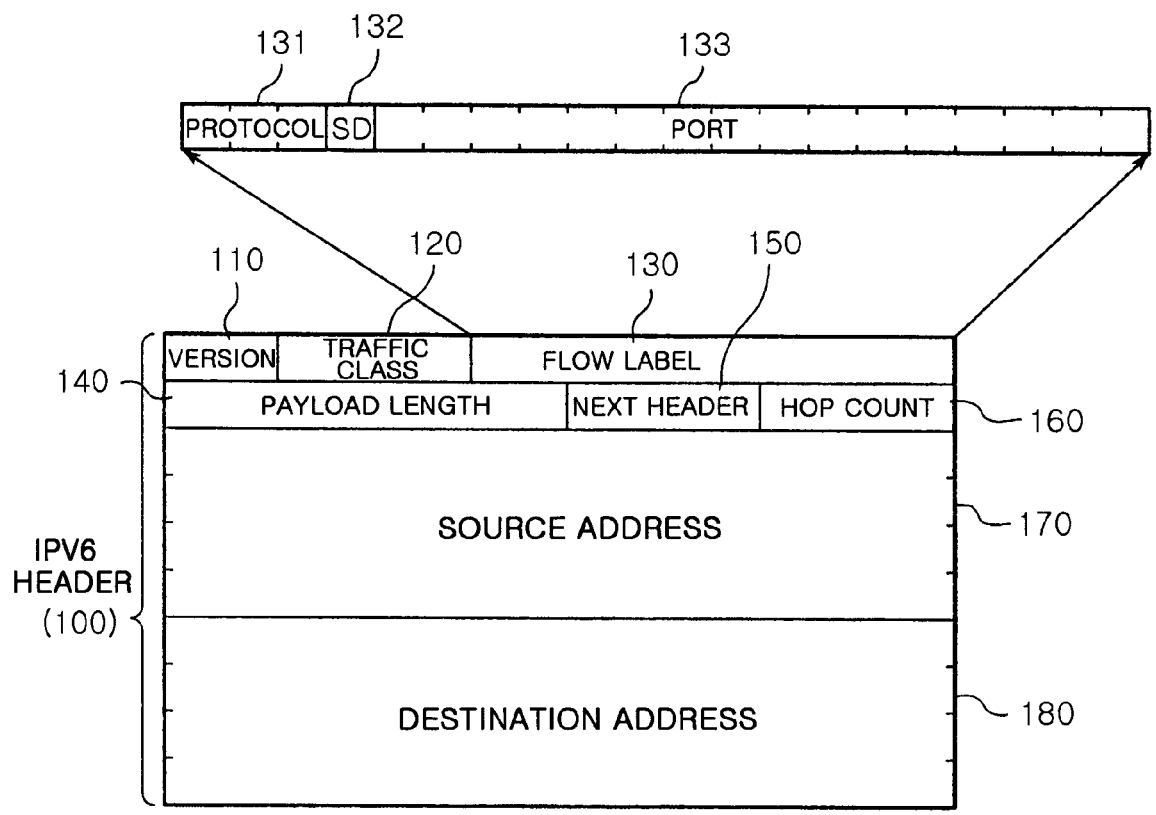
FIG. 2 shows a format of an IPv6 header with a flow label generated according to an embodiment of the present invention.
Figure 3:
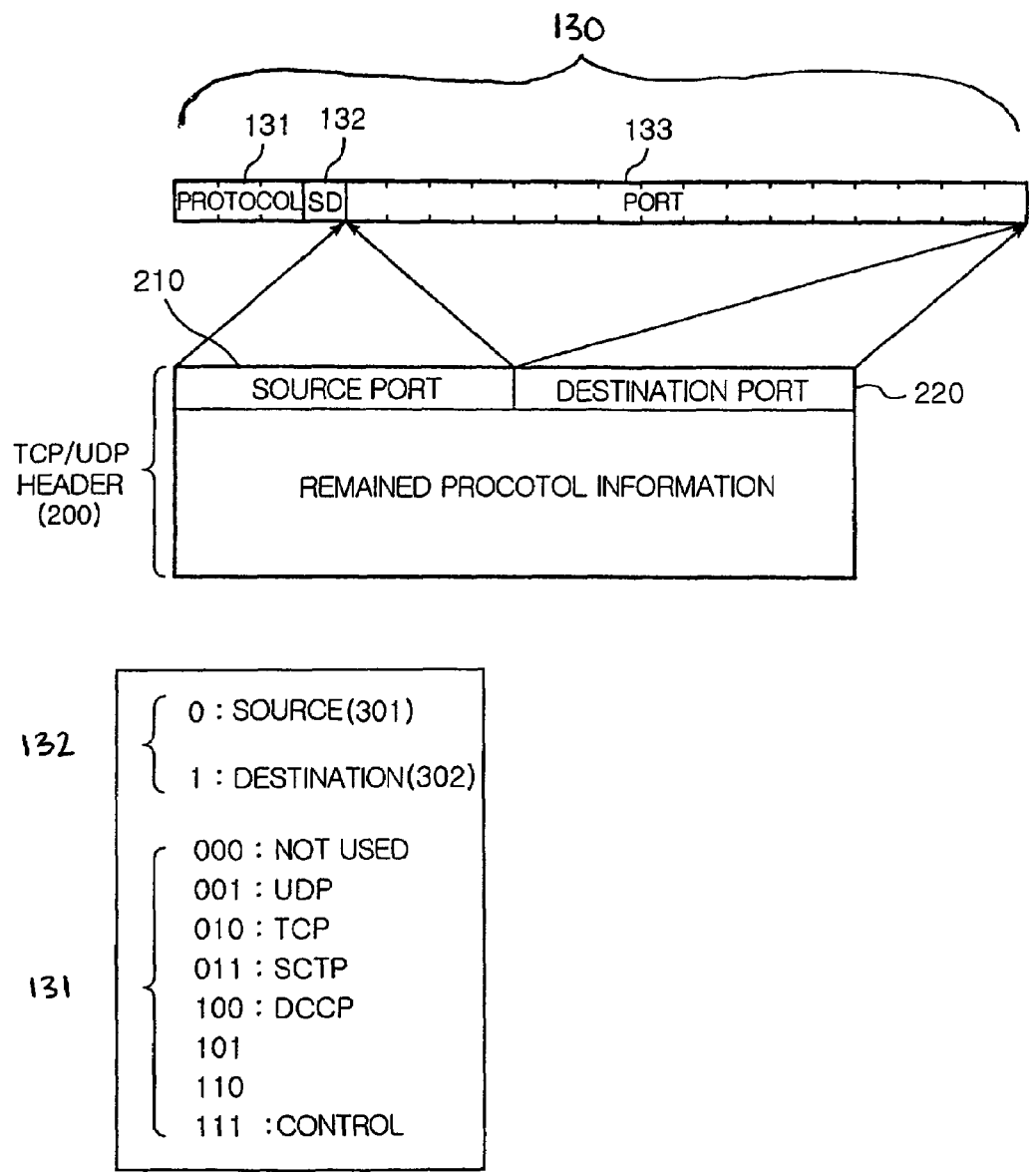
FIG. 3 shows exemplary filed values used when a flow label is generated according to an embodiment of the present invention.

FIG. 2 shows a format of an IPv6 header with a flow label generated according to an embodiment of the present invention and FIG. 3 shows exemplary filed values used when a flow label is generated according to an embodiment of the present invention.

Referring to FIGS. 2 and 3, an IPv6 header 100 according to the present embodiment is configured of a 4 bit of version field 110 for version information, a 1 byte of traffic class field 120, a 20 bit of flow label 130, a data payload length field 140, a succeeding header field 150 for information of a succeeding header, a hop limit field 160 for denoting a hot count to flow a current packet, a source IPv6 address field 170 and a destination IPv6 address field 180.

In the present embodiment, an IPv6 terminal selects four tuple information among five tuple information that can be used to classify flows of data streams and creates a header by mapping the selected four tuple information to the header in order to allow an Ipv6 network device to easily find the four tuple information from a packet although the network device receives a first packet from the IPv6 terminal. In the present invention, a transmission control protocol/user datagram protocol (TCP/UDP) header 200 is used to map the five tuple information to the four tuple information. It is because the TCP/UDP header includes a source port 210 used in a transmitter application program or a destination port 220 used in a receiver application program although the TCP/UDP header 200 includes different header information according to each transmitting scheme.

The IPv6 terminal generates a 20 bit of flow label 130 configured of a 3bit of protocol field 131, a 1 bit of SD field 132 and a 16bit source/destination port field 133, based on the four tuple information selected from the five tuple information according to the present embodiment, as shown in FIG. 3.

Referring to FIG. 3, the IPv6 flow label 130 includes a protocol field 131, a SD field 132 and a source/destination port field 133. The protocol field 131 includes information about a current service protocol. The source/destination port filed 133 selectively contains one information of a source port 210 and a destination port 220 in the TCP/UDP header 200. And, the SD field 132 is used to determine to select one of the source port 210 and the destination port 20 in the TCP/UDP header 200. The number of bits in each of the fields 131, 132 and 133 are shown in FIG. 3. However, the present invention is not limited by the shown number of bits. It may vary in various forms.

FIG. 3 shows three digit values in a binary format that can be assigned to the 3 bit of protocol field 131 to mainly denote a currently used protocol. As shown, 0 is assigned to the protocol field 131 to denote 'not used'. That is, 000 of a binary number is recorded in the 3 bit of protocol field 131. In case of a UDP, 1 is assigned to the protocol field 131 as a binary format '001'. Also, 2 is assigned to the protocol field 131 as a binary format '010' for a TCP. Furthermore, '011' is recorded in the protocol field 131 for a stream control protocol (SCTP) and '100' is recorded in the protocol field 131 for a datagram congestion control protocol (DCCP). '101' or '110' may be assigned to other protocols. '111' may be used to represent a special control case. The shown binary formats are only examples of denoting each of protocols. Therefore, the shown binary formats may be modified or differently assigned to each protocol. For example, '001' may be recorded in the protocol field 131 to denote the TCP and '010' may be recorded in the protocol field 131 to denote the UDP although '001' is used for the UDP and '010' is used for the TCP.

As described above, the SD field 132 is used to determine to select one of the source port 210 and the destination port 20 in the TCP/UDP header 200. As an example, '0' 301 denotes a source port 210 and '1' 302 denotes a destination port 220 in FIG. 3. In this case, '0' is assigned into the SD field 132 to store information of the source port 210 in the TCP/UDP header 200 in the source/destination port field 133. '1' is assigned into the SD field 132 to store information of the destination port 220 in the TCP/UDP header 200 in the source/destination port field 133. Such a shown value is only example for the present embodiment. Therefore, the values may be modified according to other embodiments. For example, '1' may be assigned for the source port and '0' may be assigned for the destination port.

As described above, the IPv6 terminal selects four tuple information among five tuple information that can be used to classify a flow and creates a header by mapping the selected four tuple information to the header. Therefore, the Ipv6 network device can easily find the four tuple information from a packet although the network device receives a first packet from the IPv6 terminal.

Even if the 20 bit of flow label is generated according to the present embodiment, the flow label includes the source port information and the destination port information which require 32 bits by selecting including one of the source port information and the destination information using the 1 bit of SD field 132. Therefore, the flow label according to the present invention allows a network device to finely classify the flows without requiring additional signaling or specific protocol.

According to the present invention, the terminal generates the flow label to have the four tuple information selected from the five tuple information when the terminal generates the header, and the network device easily and finely classifies the flows by analyzing the four tuple information in the flow label. Therefore, the method of generating the flow label can be used to differentiate the quality of service (QoS) from others.

Also, the terminal generates the flow label to selectively have the source port information and the destination port information using the SD field. Accordingly, it allows the network device to classify the flows finely. Therefore, the method of generating the flow label according to the present invention can be used to provide various differentiated services.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of generating a flow label for an IPv6 (Internet Protocol version 6) comprising:
    forming a flow based on a five tuple at an IPv6 terminal, the five tuple including a source IPv6 address, a destination IPv6 address, a service protocol, a source port and a destination port;
    selecting one of the source port or destination port to be inserted into a source/destination port field of the flow label;
    generating the flow label for the IPv6, wherein the generated flow label comprises a service protocol field, a source/destination (SD) field and the source/destination port field; and
    inserting the generated flow label into a header of an Ipv6 packet based on the formed flow,
    wherein a value of the source/destination field in the flow label determines whether the source port or destination port is inserted into the source/destination port field of the flow label.

2. The method of claim 1, wherein the flow label includes a protocol field having 3 bits, the SD field having 1 bit and the source/destination port field having 16 bits.

3. The method of claim 1, wherein the service protocol is one selected from the group consisting of a UDP (user datagram protocol), a TCP (transmission control protocol), a SCTP (stream control protocol) and a DCCP (datagram congestion control protocol).

* * * * *